US008009171B2

(12) United States Patent
Nakahashi

(10) Patent No.: US 8,009,171 B2
(45) Date of Patent: Aug. 30, 2011

(54) IMAGE PROCESSING APPARATUS AND METHOD, AND PROGRAM

(75) Inventor: Teruyuki Nakahashi, Tokyo (JP)

(73) Assignee: Sony Corporation, Tokyo (JP)

( * ) Notice: Subject to any disclaimer, the term of this patent is extended or adjusted under 35 U.S.C. 154(b) by 668 days.

(21) Appl. No.: 11/689,225

(22) Filed: Mar. 21, 2007

(65) Prior Publication Data

US 2008/0012864 A1    Jan. 17, 2008

(30) Foreign Application Priority Data

Apr. 12, 2006    (JP) .............................. P2006-109815

(51) Int. Cl.
*G06T 13/00*    (2006.01)
(52) U.S. Cl. ........................ 345/473; 345/419
(58) Field of Classification Search ........... 345/473–475
See application file for complete search history.

(56) References Cited

U.S. PATENT DOCUMENTS

| 5,764,233 | A  | * | 6/1998 | Brinsmead et al. | 345/419 |
|---|---|---|---|---|---|
| 6,538,655 | B1 | * | 3/2003 | Kubota | 345/474 |
| 6,556,196 | B1 | * | 4/2003 | Blanz et al. | 345/419 |
| 6,842,172 | B2 |   | 1/2005 | Kobayashi |  |
| 7,403,202 | B1 | * | 7/2008 | Nash | 345/474 |
| 2002/0123812 | A1 | * | 9/2002 | Jayaram et al. | 700/98 |
| 2005/0231512 | A1 | * | 10/2005 | Niles et al. | 345/473 |

FOREIGN PATENT DOCUMENTS

| JP | 2001-276416 | 10/2001 |
|---|---|---|
| JP | 2001-357415 | 12/2001 |

OTHER PUBLICATIONS

Choi et al., Analysis and Synthesis of Facial Image Sequences in Model-Based Image Coding, IEEE Transactions on Circuits and Systems for Video Technology, vol. 4, No. 3, Jun. 1994, pp. 256-275.*
Gunn et al., A Dual Active Contour for Head Boundary Extraction, IEE Colloquium on Image Processing for Biometric Measurement, Apr. 20, 1994.*

* cited by examiner

*Primary Examiner* — Xiao M Wu
*Assistant Examiner* — Charles Tseng
(74) *Attorney, Agent, or Firm* — Finnegan, Henderson, Farabow, Garrett & Dunner, L.L.P.

(57) ABSTRACT

An image processing apparatus includes the following elements. An area designating unit designates an area to be processed from an input image. A delay amount setting unit sets an amount of delay in the area to be processed according to a distance from a reference position in the image. An angular velocity calculating unit calculates angular velocities at a predetermined position in images. An angular velocity storage unit stores records of the angular velocities calculated by the angular velocity calculating unit. A reading unit reads an angular velocity calculated at a time that is prior to a current time by the amount of delay set by the delay amount setting unit from the angular velocity storage unit when the image is changed within the area to be processed. A changing unit changes the image within the area to be processed using the angular velocity read by the reading unit.

6 Claims, 18 Drawing Sheets

IMAGE PROCESSING APPARATUS AND METHOD, AND PROGRAM

CROSS REFERENCES TO RELATED APPLICATIONS

The present invention contains subject matter related to Japanese Patent Application JP 2006-109815 filed in the Japanese Patent Office on Apr. 12, 2006, the entire contents of which are incorporated herein by reference.

BACKGROUND OF THE INVENTION

1. Field of the Invention

The present invention relates to image processing apparatuses and methods, and programs. More specifically, the present invention relates to an image processing apparatus and method, and a program for easily providing animations that look "real".

2. Description of the Related Art

A real-looking computer graphics (CG) image of an object of interest, such as a human face, is generated on the basis of a faithful three-dimensional model of the face, that is, the three-dimensional shape and texture of the face. One method for producing a faithful three-dimensional model of a human face is to scan the actual face using a three-dimensional scanner. Another method is to make a mold of the actual face to produce a model and to input data of the model using a three-dimensional pointer.

These methods allow high-precision real-looking three-dimensional models to be made, and have been widely used in the production of movies including high-definition CG pictures or games that give a strong feeling of reality. However, three-dimensional scanners are expensive, and it takes considerable time to scan an entire face using a three-dimensional scanner. Three-dimensional pointers are also expensive, and are more costly (in terms of time and labor) because the operation of inputting data using a three-dimensional pointer is generally performed manually.

There have also been demands for more real-looking animations, such as more real representation of the movement of human hair. Japanese Unexamined Patent Application Publication No. 2001-357415 proposes a technique in which hairs are rendered one by one and hairstyles can be changed in accordance with a plurality of head shapes to provide more real representation of the hair.

SUMMARY OF THE INVENTION

In the CG drawing of hair, each hair or group of hairs is generally modeled with polygons, and the movement is drawn polygon-by-polygon. When hair is drawn polygon-by-polygon, a deformation is performed on a polygon-by-polygon basis. Thus, if the polygon size is large, coarseness or discontinuity in deformation or movement may become noticeable, and it is difficult to produce a real representation.

One approach for providing more real representation is to reduce the polygon size. In this case, however, a larger number of polygons are processed, leading to a reduction in processing speed or a possibility of failure of the processing. Therefore, there is a limit to the reduction of the polygon size.

In general, modeling is performed using commercially available modeling tools or the like, and manual modeling using such modeling tools is common. As described above, the manual modeling is costly, and there has been a demand for the reduction of cost.

It is therefore desirable to more easily provide real-looking animations.

According to an embodiment of the present invention, there is provided an image processing apparatus including the following elements. Area designating means designates an area to be processed from an input image. Delay amount setting means sets an amount of delay in the area to be processed according to a distance from a reference position in the image. Angular velocity calculating means calculates angular velocities at a predetermined position in a predetermined number of images including the image. Angular velocity storage means stores records of the angular velocities calculated by the angular velocity calculating means. Reading means reads an angular velocity calculated at a time that is prior to a current time by the amount of delay set by the delay amount setting means from the angular velocity storage means when the image is changed within the area to be processed. Changing means changes the image within the area to be processed using the angular velocity read by the reading means.

The area to be processed may include a hair area.

The image processing apparatus may further include angle calculating means for calculating an angle at the predetermined position from a difference between an image at a predetermined time and an images at a time prior to the predetermined time, and the angular velocity calculating means may calculate each of the angular velocities from a difference between angles determined by the angle calculating means.

A changing process performed by the changing means may be performed using a pixel shader, and data used for the pixel shader to perform the changing process may be included in a texture and may be supplied.

According to another embodiment of the present invention, there is provided an image processing method including the steps of designating an area to be processed from an input image; setting an amount of delay in the area to be processed according to a distance from a reference position in the image; calculating angular velocities at a predetermined position in a predetermined number of images including the image; controlling storage of records of the calculated angular velocities; reading an angular velocity calculated at a time that is the set amount of delay prior to a current time from among the records whose storage is controlled when the image is changed within the area to be processed; and changing the image within the area to be processed using the read angular velocity.

According to still another embodiment of the present invention, there is provided a program for allowing a computer to execute a process including the steps of designating an area to be processed from an input image; setting an amount of delay in the area to be processed according to a distance from a reference position in the image; calculating angular velocities at a predetermined position in a predetermined number of images including the image; controlling storage of records of the calculated angular velocities; reading an angular velocity calculated at a time that is the set amount of delay prior to a current time from among the records whose storage is controlled when the image is changed within the area to be processed; and changing the image within the area to be processed using the read angular velocity.

According to the image processing apparatus and method, and the program according to the embodiments of the present invention, an area of an image to be changed is detected, and a calculation using an angular speed read on the basis of an amount of delay determined according to the distance from a predetermined position is performed when the image within the area is changed. As a result of the calculation, the image is changed.

According to an embodiment of the present invention, therefore, a natural and real representation of an object such as hair can be realized using computer graphics.

According to another embodiment of the present invention, pixel-by-pixel representations can be performed using computer graphics, and more natural and real-looking animations can be realized.

DESCRIPTION OF THE PREFERRED EMBODIMENTS

Figure 1:
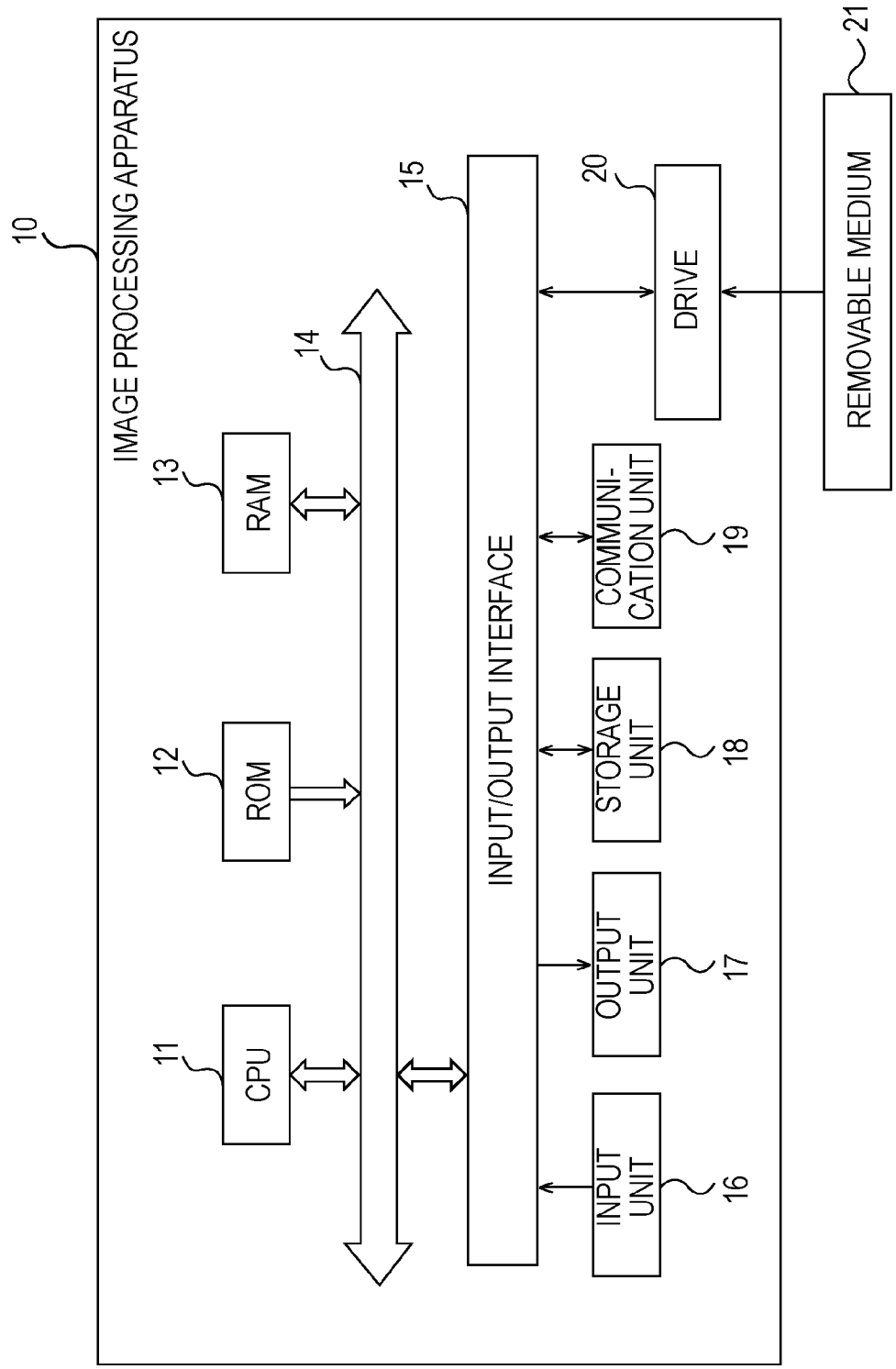
FIG. 1 is a block diagram showing the structure of an image processing apparatus according to an embodiment of the present invention.

Before describing an embodiment of the present invention, the correspondence between the features of the claims and the specific elements disclosed in an embodiment of the present invention is discussed below. This description is intended to assure that embodiments supporting the claimed invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

An image processing apparatus (e.g., an image processing apparatus 10 shown in FIG. 2) according to an embodiment of the present invention includes area designating means (e.g., a movable-range setting unit 43 shown in FIG. 2) for designating an area to be processed from an input image; delay amount setting means (e.g., a delay-amount setting unit 44 shown in FIG. 2) for setting an amount of delay in the area to be processed according to a distance from a reference position in the image; angular velocity calculating means (e.g., angular velocity calculating unit 47 shown in FIG. 2) for calculating angular velocities at a predetermined position in a predetermined number of images including the image; angular velocity storage means (e.g., a calculation value storage unit 48) for storing records of the angular velocities calculated by the angular velocity calculating means; reading means (e.g., a delay amount determining unit 49 shown in FIG. 2) for reading an angular velocity calculated at a time that is prior to a current time by the amount of delay set by the delay amount setting means from the angular velocity storage means when the image is changed within the area to be processed; and changing means (e.g., a texture changing unit 50 shown in FIG. 2) for changing the image within the area to be processed using the angular velocity read by the reading means.

The image processing apparatus further includes angle calculating means (e.g., an angle calculating unit 46 shown in FIG. 2) for calculating an angle at the predetermined position from a difference between an image at a predetermined time and an image at a time prior to the predetermined time.

An embodiment of the present invention will be described with reference to the drawings.

Structure of Image Processing Apparatus

FIG. 1 is a diagram showing an image processing apparatus 10 according to an embodiment of the present invention. The image processing apparatus 10 can be implemented by a computer.

The image processing apparatus 10 includes a central processing unit (CPU) 11. The CPU 11 is connected to an input/output interface 15 via a bus 14. In response to an instruction input by a user through the input/output interface 15 using an input unit 16 including a keyboard, a mouse, and a microphone, the CPU 11 executes a program stored in a read only memory (ROM) 12.

Alternatively, the CPU 11 loads into a random access memory (RAM) 13 a program, such as a program stored in a storage unit 18 formed of a hard disk or the like, a program transferred via a satellite or a network, received by a communication unit 19, and installed in the storage unit 18, or a program read from a removable medium 21 placed in a drive 20 and installed into the storage unit 18, and executes the program. Thus, the CPU 11 performs processes in accordance with flowcharts described below or processes executed by the structure of block diagrams described below.

The CPU 11 outputs or transmits a processing result from an output unit 17 including a liquid crystal display (LCD) and speakers or from the communication unit 19 via the input/output interface 15, if necessary. The CPU 11 further records the processing result in the storage unit 18.

The program executed by the CPU 11 can be recorded in advance in the storage unit 18 or the ROM 12 serving as a built-in recording medium of the image processing apparatus 10. Alternatively, the program can be temporarily or persistently stored (or recorded) in the removable medium 21 such as a flexible disk, a compact disc read only memory (CD-ROM), a magneto optical (MO) disk, a digital versatile disc (DVD), a magnetic disk, or a semiconductor memory. The removable medium 21 is available as so-called packaged software.

The program may be installed from the removable medium 21 such as that described above to the image processing apparatus 10, or may be transferred from a download site by wireless transmission to the image processing apparatus 10 via an artificial satellite for digital satellite broadcasting or by wired transmission to the image processing apparatus 10 via a network such as a local area network (LAN) or the Internet. In the image processing apparatus 10, the thus transferred program can be received by the communication unit 19 serving as an interface compatible with a communication standard such as NIC (Network Interface Card), IEEE (Institute of Electrical and Electronics Engineers) 1394, or USB (Universal Serial Bus), and can be installed in the storage unit 18.

In the embodiment shown in FIG. 1, the image processing apparatus 10 (i.e., the CPU 11) executes the (application) program installed in the storage unit 18 to thereby function as an image processing apparatus configured to perform a modeling process and an animation process. The modeling process is a process for generating a three-dimensional model of a three-dimensional object, such as a human face, from a two-dimensional image in which the human face is displayed (or appears). The animation process is a process for generating a CG animation in which the face (or a part of the face) moves from the three-dimensional model and displaying the animation. The following description will be given in the context of the function of the image processing apparatus for performing a process for providing a more real representation of the movement of hair.

Figure 2:
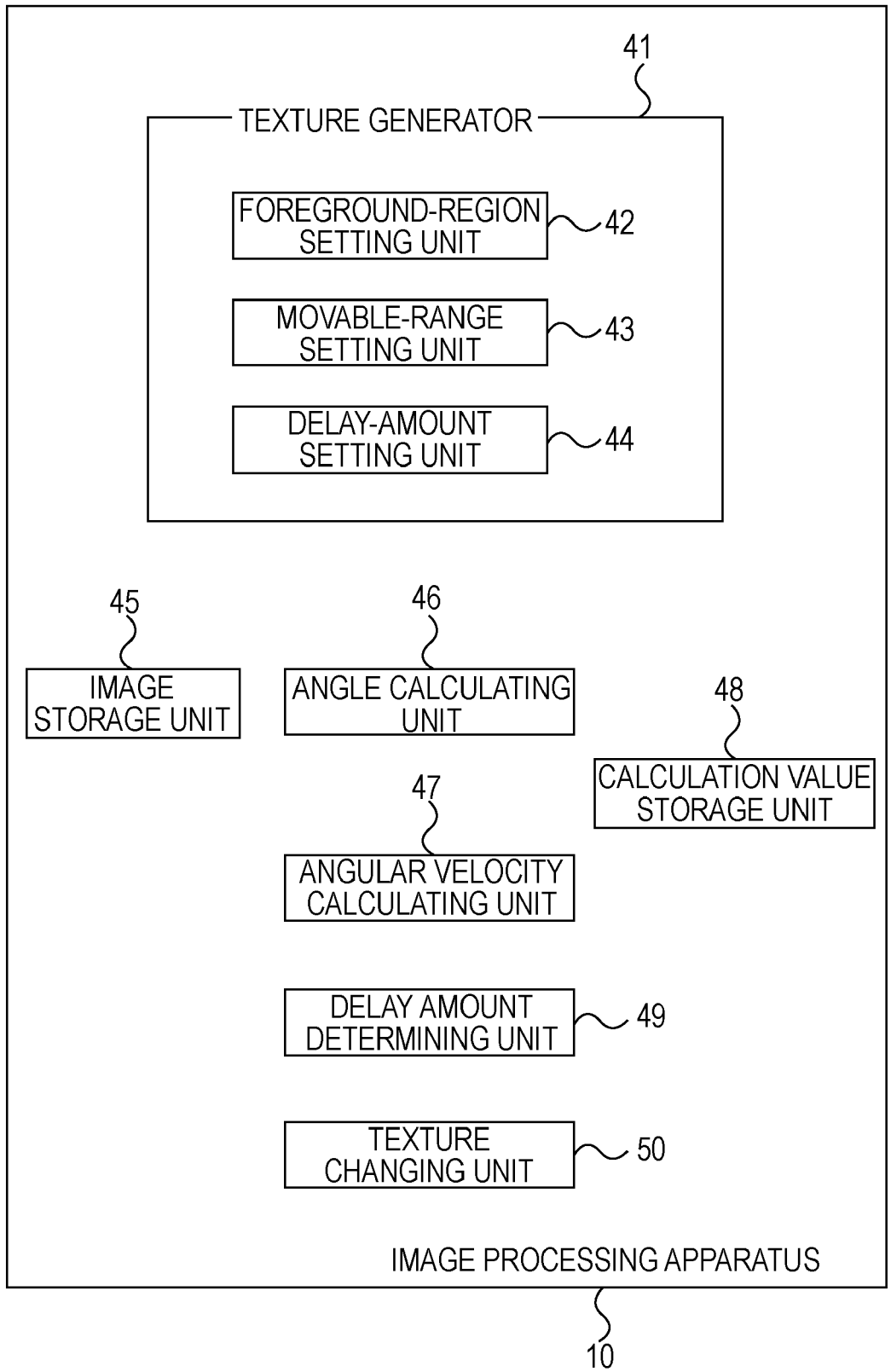
FIG. 2 is a block diagram showing the functions of the image processing apparatus.

FIG. 2 is a functional block diagram of the image processing apparatus 10 that is equivalently implemented by executing the program by the image processing apparatus 10 shown in FIG. 1. The image processing apparatus 10 includes a texture generator 41. The texture generator 41 includes three setting units, namely, a foreground-region setting unit 42, a movable-range setting unit 43, and a delay-amount setting unit 44. Each of the setting units generates a texture, as described below, according to setting information.

The image processing apparatus 10 further includes an image storage unit 45, an angle calculating unit 46, an angular velocity calculating unit 47, a calculation value storage unit 48, a delay amount determining unit 49, and a texture changing unit 50. The image storage unit 45 stores images corresponding to consecutive two frames. The angle calculating unit 46 uses the images of two frames stored in the image storage unit 45 to detect a difference, i.e., an angle, between the positions before and after the movement of the texture within a polygon at a predetermined address of an image to be processed to another polygon, and stores the detected angle in the calculation value storage unit 48. The calculation value storage unit 48 stores records of angles detected for a predetermined period of time.

The angle velocity calculating unit 47 uses the records of angles stored in the calculation value storage unit 48 to detect an angular velocity at which the texture within a polygon at a predetermined address has moved, and stores the angular velocity in the calculation value storage unit 48. The calculation value storage unit 48 stores records of angular velocities detected for a predetermined period of time.

The delay amount determining unit 49 determines an amount of delay. The amount of delay is used to determine an angular velocity used for a calculation for changing the texture within a polygon, as described below. The angular velocity based on the amount of delay determined by the delay amount determining unit 49 is read from the calculation value storage unit 48. The texture changing unit 50 performs a calculation using the read angular velocity to change the texture within the polygon.

Figure 3:
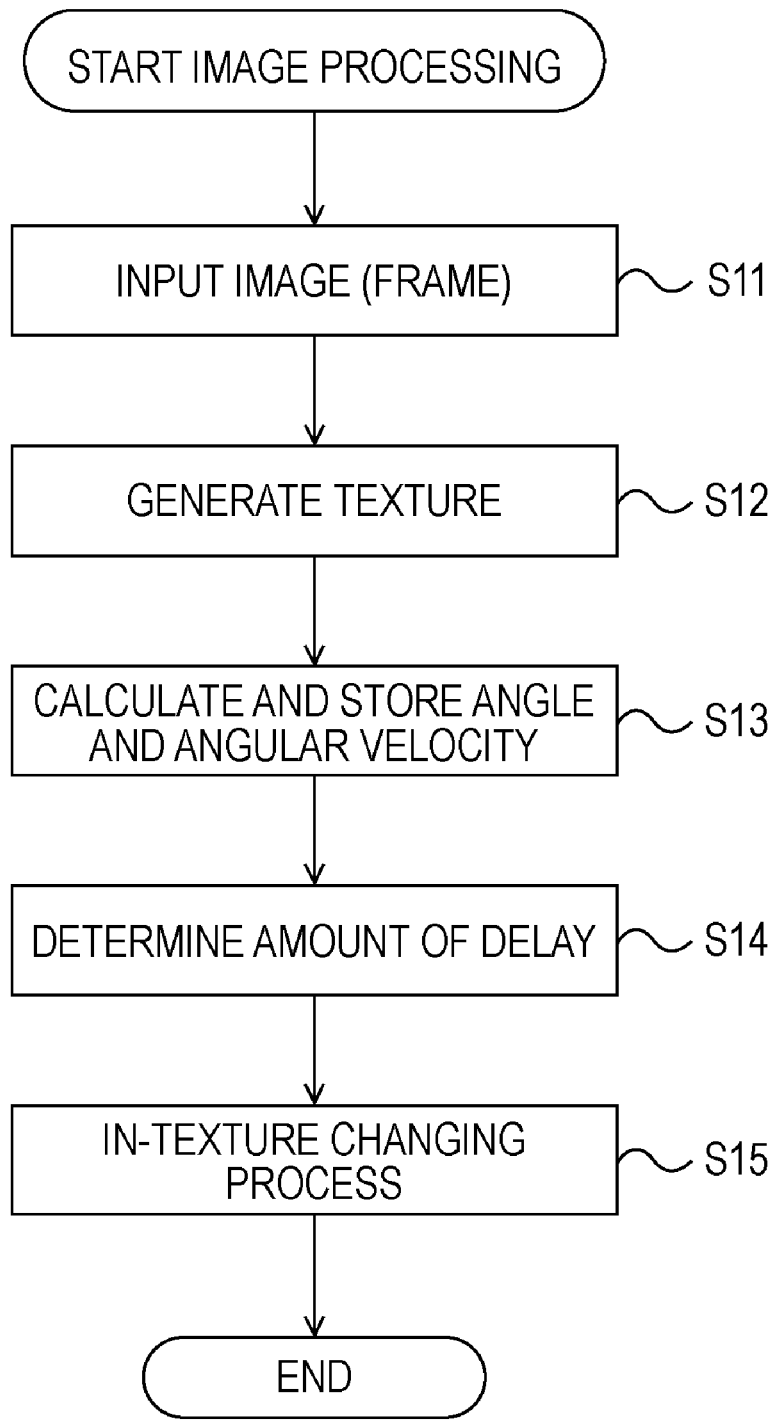
FIG. 3 is a flowchart showing the operation of the image processing apparatus.

The operation of the image processing apparatus 10 having the functions described above will be described with reference to a flowchart shown in FIG. 3.

In step S11, the image processing apparatus 10 inputs an image (or a frame) to be processed. The image storage unit 45 (see FIG. 2) stores the input image. The image input to the image processing apparatus 10 is used for animation.

The initial image is an image taken by a digital (still) camera or an image captured by a scanner or the like. An image subsequent to the initial image is an image obtained by modifying the initial image (e.g., an image subjected to processing described below). This image is one frame of an animation and is an image generated as a result of the process (described below) performed by the image processing apparatus 10.

Figure 4:
FIG. 4 is a diagram showing an example of a texture.
Figure 5:
FIG. 5 is a diagram showing an example of a texture.
Figure 6:
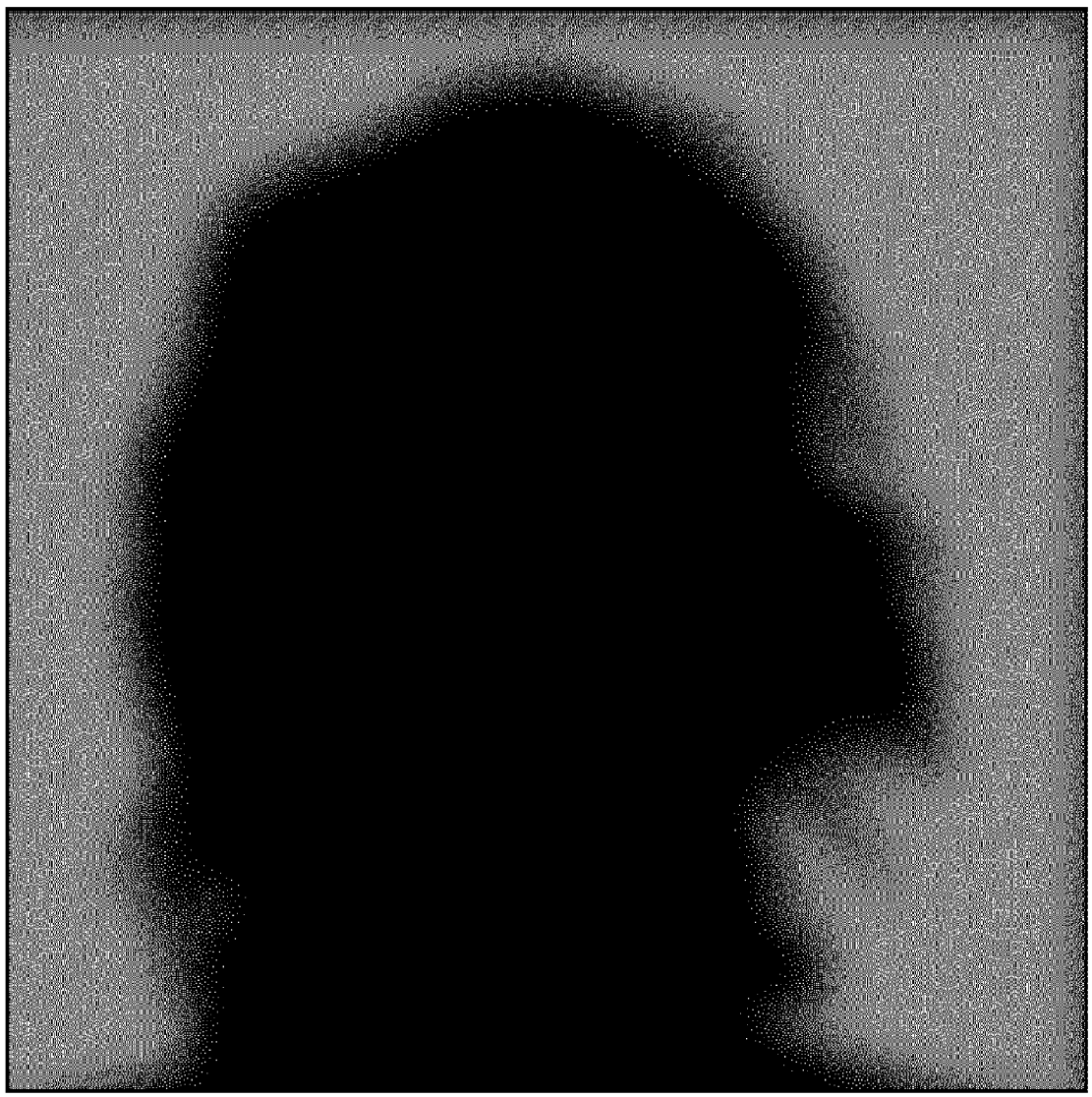
FIG. 6 is a diagram showing an example of a texture.

In step S12, the texture generator 41 analyzes the input image to generate textures shown in FIGS. 4 to 6.

The texture shown in FIG. 4 is an example of a texture generated by the foreground-region setting unit 42. The foreground-region setting unit 42 determines a boundary between a background and a foreground, and generates a texture in which the background is set to black and the foreground is set to white. As used herein, the term foreground refers to a region including portions of the face and hair of a person. In the following description, the background is set to black and the foreground is set to white. However, the background may be set to white and the foreground may be set to black (the same applies to the other textures).

Figure 8:
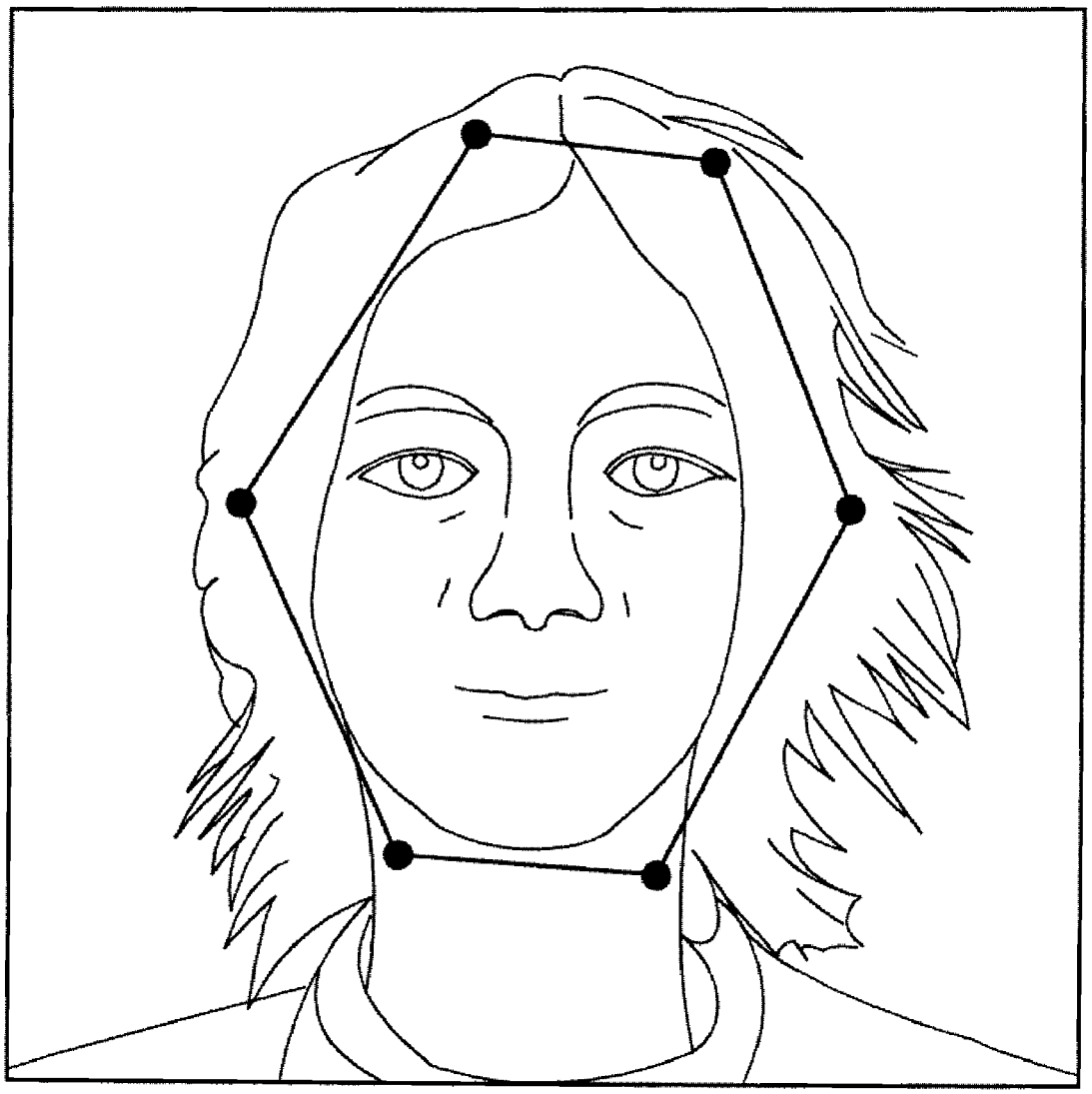
FIG. 8 is a diagram showing a method for designating an area.

In this manner, the foreground-region setting unit 42 generates a texture for distinguishing between the background and the foreground. The texture shown in FIG. 4 (hereinafter referred to as a "foreground texture", if necessary) is a foreground texture generated, for example, when an image shown in FIG. 8 is supplied as an initial image (the same applies to the other textures).

When the foreground-region setting unit 42 generates a foreground texture, the foreground-region setting unit 42 identifies the foreground and the background on the basis of α values of the image to be processed, and generates a foreground texture according to the identification result.

The texture shown in FIG. 5 is an example of a texture generated by the movable-range setting unit 43. The movable-range setting unit 43 designates an area larger than a hair area as a movable range, and generates a texture (hereinafter referred to as a "movable-range texture", if necessary) in which the movable range is set to white and the remaining area is set to black, as shown in FIG. 5.

As discussed below, the movable range is a range in which the texture for the hair is modified, or in other words, a range in which the details of the texture are changed on a pixel-by-pixel basis according to a motion parameter. A process for generating a movable-range texture is described below with reference to a flowchart shown in FIG. 7.

The texture shown in FIG. 6 is an example of a texture generated by the delay-amount setting unit 44. The delay-amount setting unit 44 introduces the concept of delay, as discussed below, to modify the texture within a polygon. That is, a calculation based on the amount of delay is performed to change the texture to be pasted onto a polygon. The delay-amount setting unit 44 determines the amount of delay used for the texture changing process, and generates a texture having a value set for the process (hereinafter referred to as a "delay-amount texture", if necessary). If the amount of delay is represented in terms of gradation, as shown in FIG. 6, the color intensity is set to be reduced step-by-step from a boundary line between the face and the hair. The lower the color intensity, the larger the amount of delay.

For example, when the face is turned to the right or left, hairs around the face move along with the movement of the face, whereas the tips of the hairs, which are far from the face, move a short time after (or move with a delay from) the movement of the face. In an animation with the face being turned to the right or left, therefore, the amount of delay is determined so that the amount of delay at a position far from the face is larger than that near the face, and the texture shown in FIG. 6 is thus generated.

Figure 7:
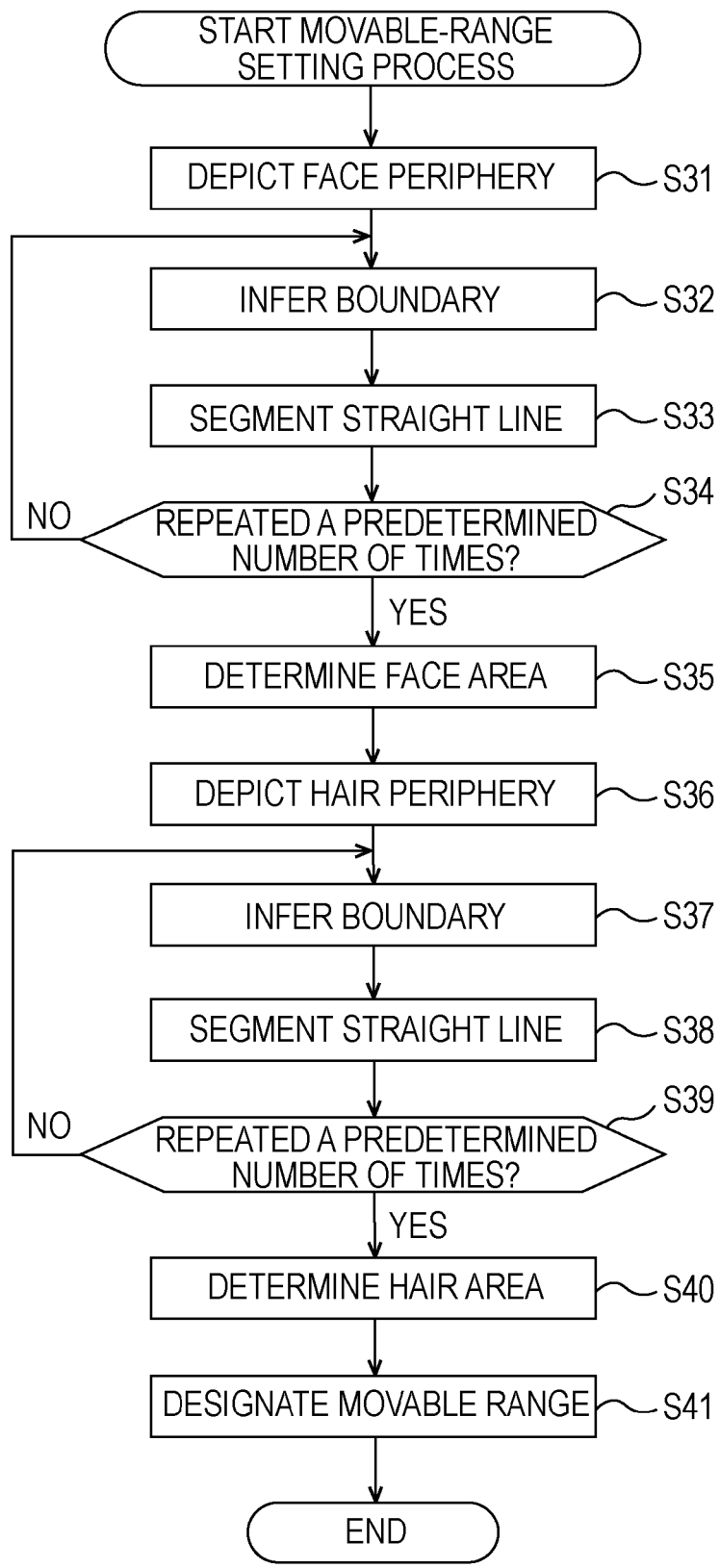
FIG. 7 is a flowchart showing a process for setting a movable range.

A process for generating the movable-range texture shown in FIG. 5 will be described with reference to the flowchart shown in FIG. 7.

In step S31, a face periphery is depicted. The face periphery is depicted by, as shown in FIG. 8, surrounding, by an outline, a portion of the input image that is predicted as a face portion (which does not include a hair portion).

As shown in FIG. 8, a substantially elliptic area including the eyes, nose, and mouth is represented using a set of straight lines, thereby surrounding the portion predicted as the face portion by an outline. In this way, facial features such as the eyes, nose, and mouth are extracted in order to surround the portion predicted as the face portion, and, in step S31, a face periphery is depicted so as to surround the extracted facial features.

An existing method, e.g., AAM (Active Appearance Models), can be used to detect the position of a face and the positions of facial features such as the eyes, the nose, and the mouth.

As shown in FIG. 8, the straight lines are drawn between points. Information for the points (or the straight lines) is generated, such as information for determining the relationship between the position of a given point (or straight line) and points (or straight lines) adjacent to the given point (or straight line within the set of points (or straight lines)).

Figure 9:
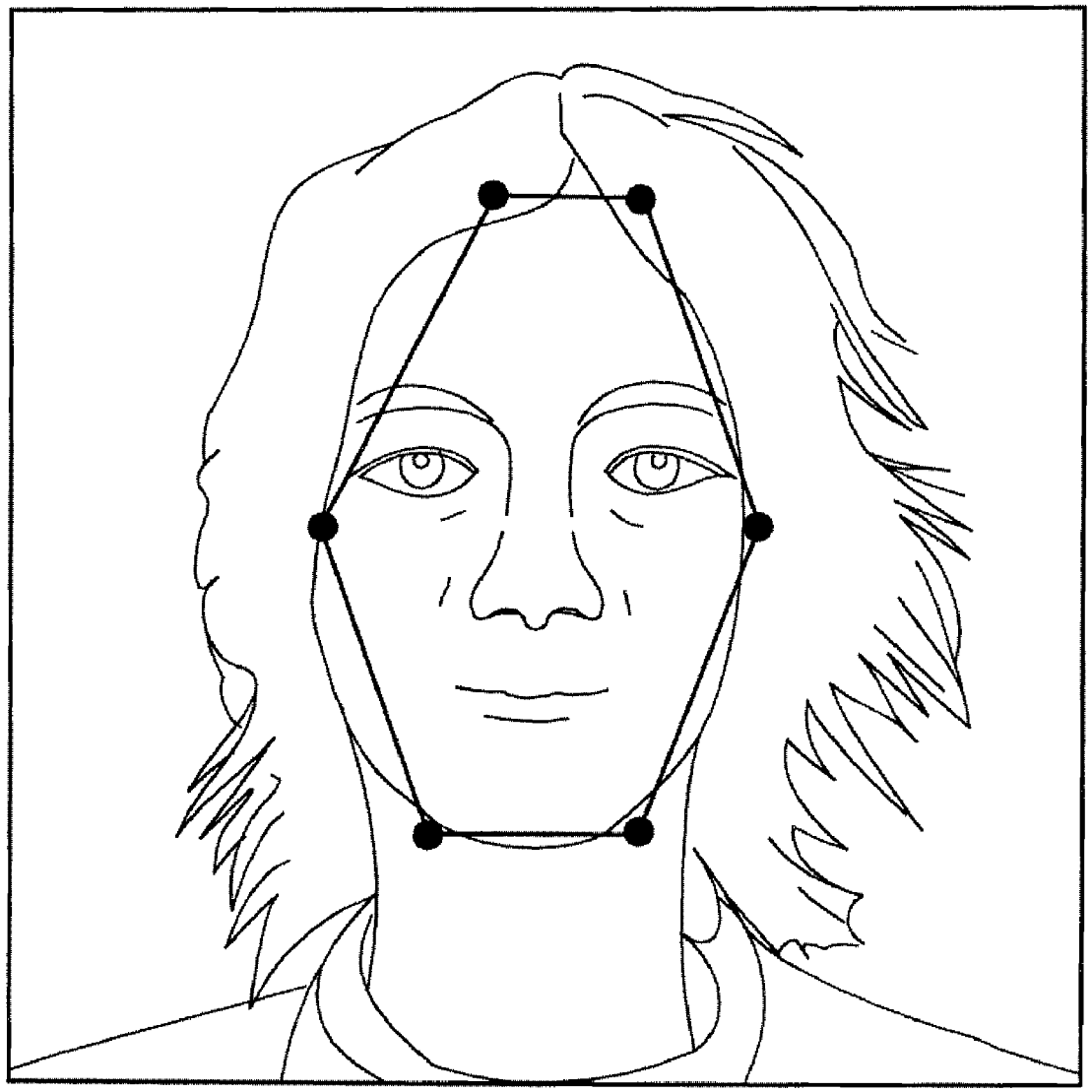
FIG. 9 is a diagram showing the method for designating an area.

In step S32, a boundary of the face and the hair is inferred. The inference of the boundary is performed by sampling pixel values of the image around a straight line to be processed while moving the straight lines, and determining the face portion and the non-face portion from differences between the sampled pixel values or the like. After the determination, the end points of the straight lines are connected, and a face area is surrounded in the manner shown in FIG. 9.

The boundary may be determined, after the sampling of the pixel values, on the basis of pixel brightness, color information, an analysis result of the texture of the area to be processed, or the like.

Figure 10:
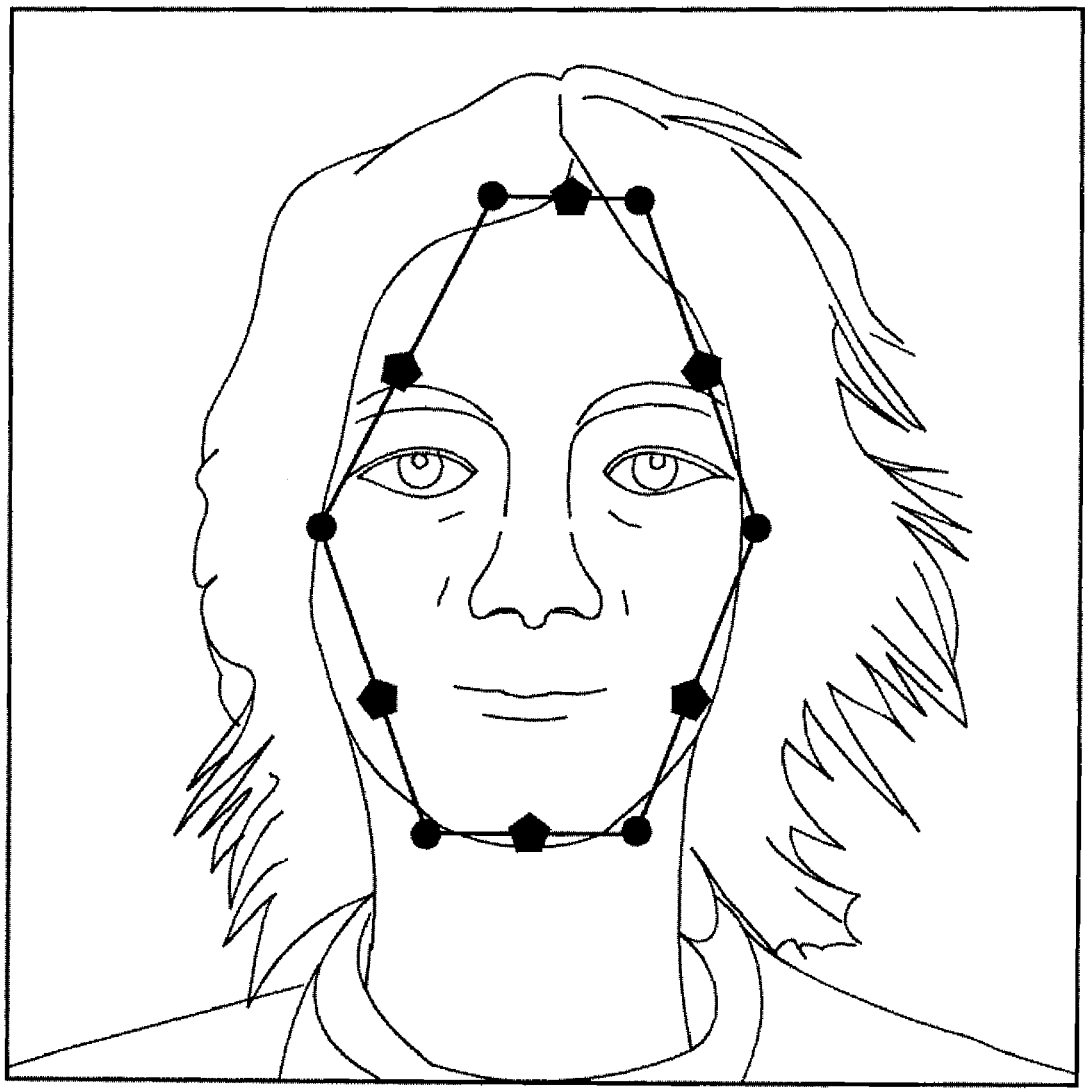
FIG. 10 is a diagram showing the method for designating an area.

In step S33, the straight lines are segmented for the more precise designation of the face area. The segmentation of the straight lines is performed by dividing a straight line between points into two or a plurality of segments (that is, generating a new point on the straight line). The image subjected to the segmentation of the straight lines is shown in FIG. 10. In FIG. 10, a point indicated by circle represents an original point, and a point indicated by pentagon represents a newly generated point. As a result of the generation of new points, the number of points increases from six to 12.

In step S34, it is determined whether or not the above-described process (i.e., the processing of steps S32 and S33) has been repeated a predetermined number of times. If it is determined in step S34 that the process has not been repeated the predetermined number of times, the process returns to step S32, and the subsequent process is repeatedly performed.

Figure 11:
FIG. 11 is a diagram showing the method for designating an area.
Figure 12:
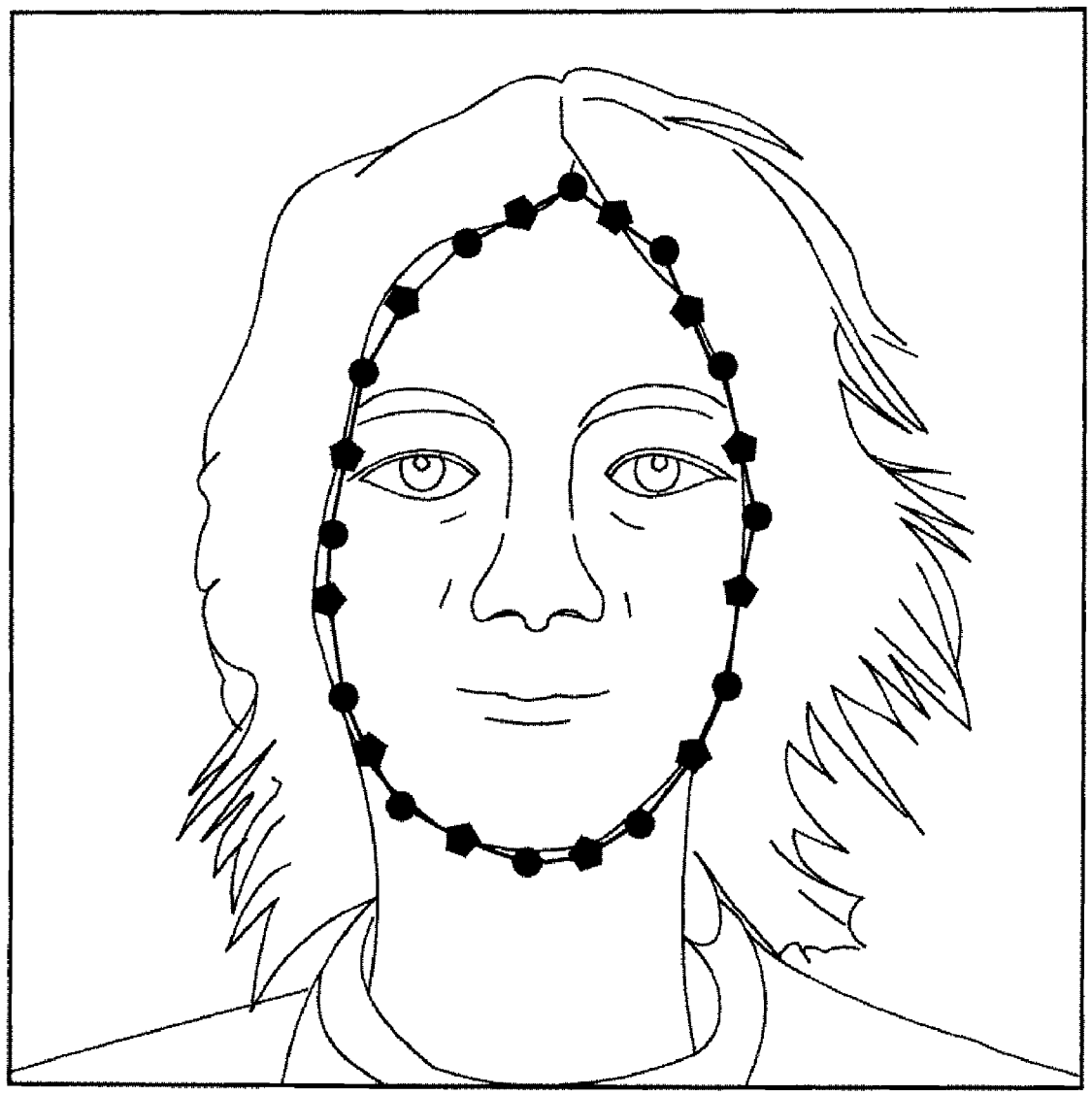
FIG. 12 is a diagram showing the method for designating an area.

FIG. 11 is a diagram showing a result of the inference of the boundary between the face and the hair with respect to the straight lines by further applying the processing of step S32 to the image shown in FIG. 10. FIG. 12 is a diagram showing a result of the segmentation of the straight lines by applying the processing of step S33 to the image shown in FIG. 11. By repeating the segmentation of the straight lines and the inference of the boundary with respect to the straight lines, the boundary between the face and the hair is inferred (or designated) more accurately step by step.

Figure 13:
FIG. 13 is a diagram showing the method for designating an area.

The processing of steps S32 to S34 is repeatedly performed, and if it is determined in step S34 that the process has been repeated the predetermined number of times, in step S35, a face area is determined. The face area is an area defined within the outline designated as the boundary between the face and the hair. FIG. 13 shows a face area determined by the series of operations.

When the face area is designated, then, a hair area is designated. The designation of the hair area is basically performed by a similar process to the designation of the face area. That is, in step S36, a hair periphery is depicted. In step S37, the boundary (in this case, the boundary between the background and the hair) is inferred with respect to the straight lines. In step S38, the straight lines are segmented. In step S39, it is determined whether or not the process has been repeated a predetermined number of times, and the process subsequent to step S37 is repeatedly performed according to the determination result.

Figure 14:
FIG. 14 is a diagram showing the method for designating an area.

If it is determined in step S39 that the process has been repeated the predetermined number of times, the process proceeds to step S40, and a hair area is determined. The hair area is an area defined between the boundary of the hair and the background and the boundary of the face and the hair. Since the boundary between the face and the hair has been designated, a hair area can be designated once the boundary between the hair and the background is determined. FIG. 14 shows a boundary line between the hair and the background, which is determined by the processing of steps S36 to S39.

In step S41, a movable range is designated. The movable range is an area larger than the hair area. The movable range can be designated by, for example, depicting the boundary between the hair and the background (that is, the boundary line shown in FIG. 14) using a line or spline, and extending the line (or spline) for image processing.

Figure 15:
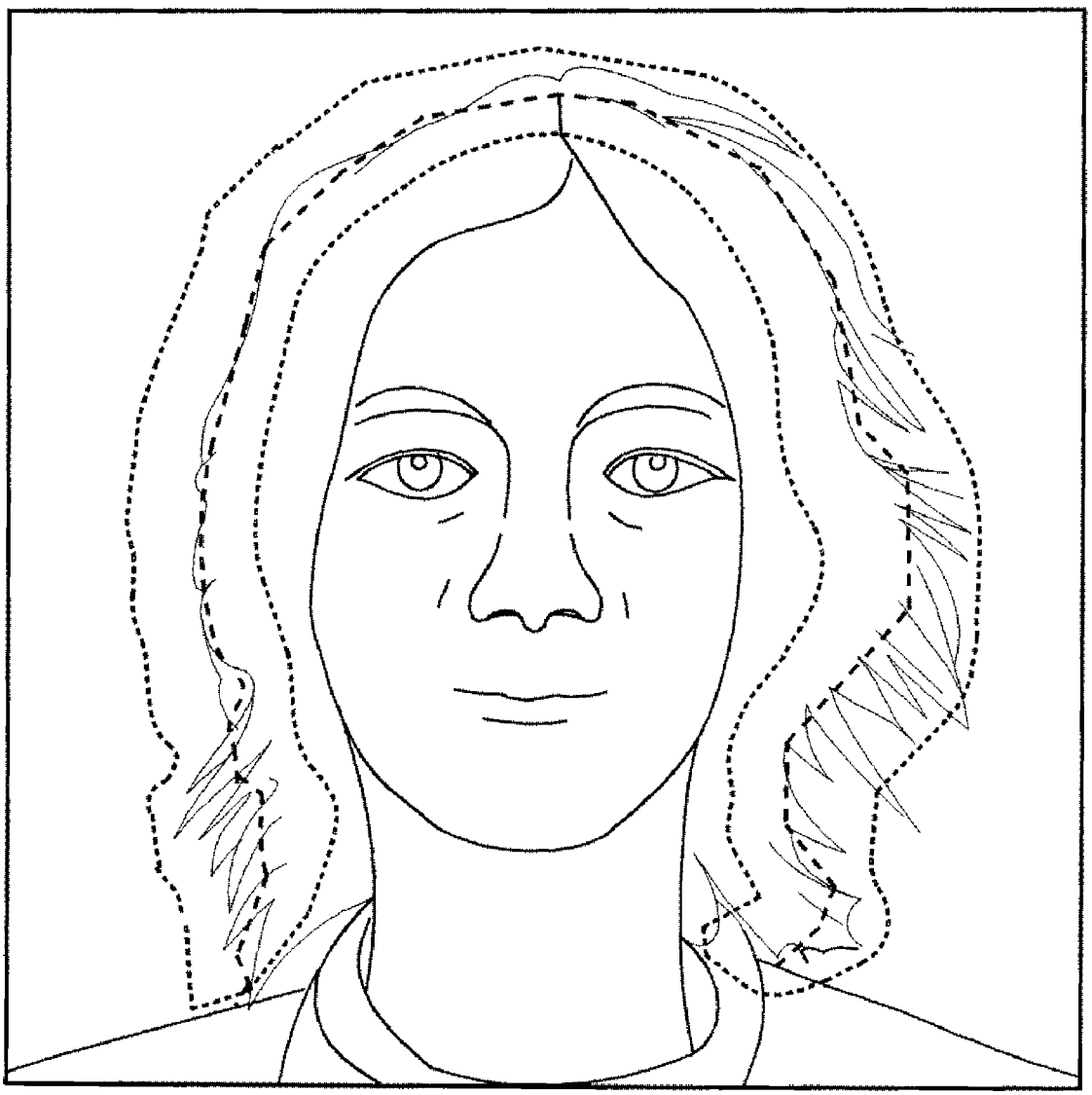
FIG. 15 is a diagram showing the method for designating an area.

FIG. 15 shows the designated movable range. As shown in FIG. 15, an area larger than the hair area is designated as a movable range. The designated movable range is set to white and the remaining area is set to black to thereby generate the movable-range texture shown in FIG. 5.

The delay-amount texture shown in FIG. 6 is generated by designating the boundary between the face and the hair (that is, designating a face area) in the image shown in, for example, FIG. 13 and then sequentially determining amounts of delay such as an amount of delay 1 for a polygon positioned in a predetermined range with respect to the boundary line, an amount of delay 2 for a polygon positioned in a subsequent predetermined range, and an amount of delay 3 for a polygon positioned in a further subsequent predetermined range. In this case, the amount of delay is set to a small value for a position near the face area, and is set to a large value for a position far from the face area.

The process using the thus generated foreground texture, movable-range texture, and delay-amount texture will still be described. Referring back to the flowchart shown in FIG. 3, in step S12, the textures shown in FIGS. 4 to 6 are generated. In step S13, an angle and an angular velocity are calculated and stored.

The angle is used to calculate the angular velocity. The angle is calculated by the angle calculating unit 46, and the angular velocity is calculated by the angular velocity calculating unit 47. The calculated angle and angular velocity are stored in the calculation value storage unit 48. The calculation value storage unit 48 stores angles and angular velocities calculated for a predetermined period of time (i.e., a predetermined number of frames).

That is, the calculation value storage unit 48 stores records of angles rot and angular velocities ω as follows:

rotx[$x_1, x_2, x_3, \ldots, x_{t-1}, x_t, \ldots$]

roty[$y_1, y_2, y_3, \ldots, y_{t-1}, y_t, \ldots$]

ωx[$\omega x_1, \omega x_2, \omega x_3, \ldots, \omega x_{t-1}, \omega x_t, \ldots$]

ωy[$\omega y_1, \omega y_2, \omega y_3, \ldots, \omega y_{t-1}, \omega y_t, \ldots$]

The angles rotx and roty are determined by calculating a difference between frames. The angular velocities are determined from the angles. For example, the angular velocity $\omega x_t$ in the x-axis direction at time t is determined by subtracting the angle $rotx_{t-1}$ at time t−1, which corresponds to a frame one frame previous to the current frame, from the angle $rotx_t$ at the time t. That is, the following equation is obtained:

angular velocity $\omega x_t$ = angle $rotx_t$ − angle $rot x_{t-1}$

Accordingly, the records of angular velocities are generated from the records of angles. The records of angles and the records of angular velocities are updated as necessary (that is, new data is added).

In step S14, the delay amount determining unit 49 determines an amount of delay. In step S15, the texture changing unit 50 modifies the textures on the basis of the determined amount of delay.

Figure 16:
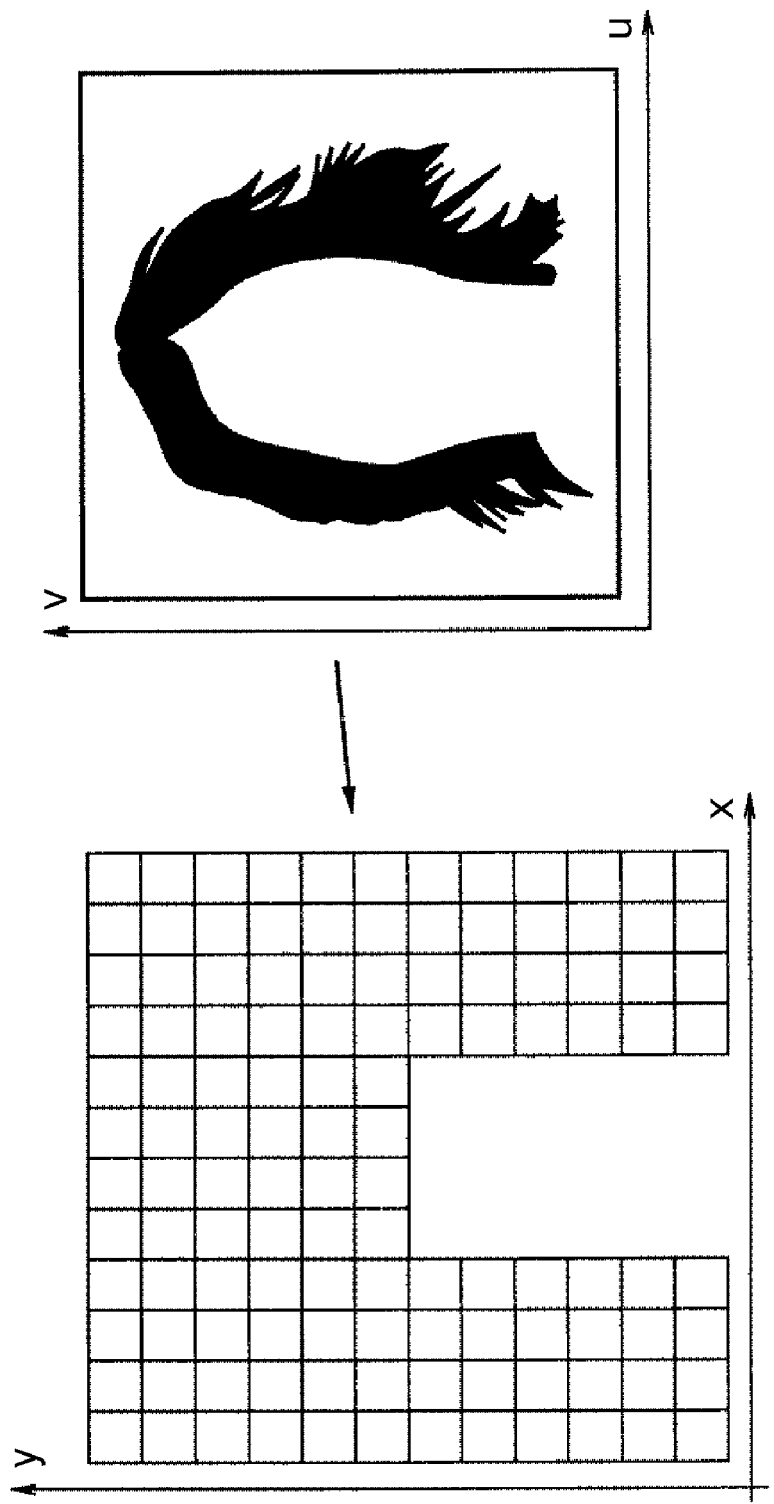
FIG. 16 is a diagram showing coordinates.

The processing of steps S13 to S15 will further be described. First, as shown in FIG. 16, simple-shaped polygons using a hair image as a texture are located on the head in an image of a person. In the embodiment, as shown in the left portion of FIG. 16, simple-shaped polygons such as cubic polygons can be used, thus achieving a less complex process than a process using complex-shaped polygons or a process in which a large number of polygons are to be processed.

The texture of the hair image shown in the right portion of FIG. 16 is pasted onto the simple-shaped polygons shown in the left portion of FIG. 16. With the use of α values, the hair portion and the non-hair portion can be separated. The non-hair portion is set to transparent and is controlled so as not to be rendered.

By changing a texture address at which a pixel value is assigned to each pixel without changing the texture of the hair image, the movement of the hairs can realistically be represented. A "fluctuation" is further applied to the texture addresses to represent the movement of the hairs. The amount of delay, which is a parameter, is used to change the texture addresses.

The coordinates of the polygons shown in the left portion of FIG. 16 (hereinafter referred to as "model-surface coordinates") are represented by (x, y). The coordinates of the texture of the hair image shown in the right of FIG. 16 are represented by (u, v).

The coordinates (u, v) of a "non-moving" texture part in the texture are represented as below using the model-surface coordinates (x, y):

$$u = \text{func\_}u(x,y) \quad \text{Eq. (1)}$$

$$v = \text{func\_}v(x,y) \quad \text{Eq. (2)}$$

where func_u denotes a predetermined function defining the coordinate u, and func_v denotes a predetermined function defining the coordinate v.

Using Eqs. (1) and (2), the coordinates (u, v) of the "non-moving" texture part in the texture are determined. As can be seen from Eqs. (1) and (2), the coordinates (u, v) of the "non-moving" texture part can be represented by a function of only the model-surface coordinates (x, y).

The coordinates (u, v) of a "moving" texture part in the texture are represented as below using the model-surface coordinates (x, y) and a function taking a "fluctuation" factor that varies over the time t (i.e., frame) into consideration:

$$u = \text{func\_}u(x,y) + du(x,y,t) \quad \text{Eq. (3)}$$

$$v = \text{func\_}v(x,y) + dv(x,y,t) \quad \text{Eq. (4)}$$

The first term in the right side of Eq. (3) is equal to that of Eq. (1), and the first term in the right side of Eq. (4) is equal to that of Eq. (2). That is, the coordinates of the "moving" texture part is determined by adding the second term in the right side, i.e., du(x, y, t) and dv(x, y, t), to the coordinates of the "non-moving" texture part.

A specific example of functions of du(x, y, t) and dv(x, y, t) is as follows:

$$\begin{aligned} du(x, y, t) = &\, \alpha 1(x, y) \times \omega x(x, y, t) + \\ &\, \alpha 2(x, y) \times \omega y(x, y, t) + \\ &\, \alpha 3(x, y) \times \omega z(x, y, t) + \\ &\, \alpha 4(t) \end{aligned} \quad \text{Eq. (5)}$$

$$\begin{aligned} dv(x, y, t) = &\, \alpha 5(x, y) \times \omega x(x, y, t) + \\ &\, \alpha 6(x, y) \times \omega y(x, y, t) + \\ &\, \alpha 7(x, y) \times \omega z(x, y, t) + \\ &\, \alpha 8(t) \end{aligned} \quad \text{Eq. (6)}$$

In Eqs. (5) and (6), α1, α2, α3, α5, α6, and α7 denote coefficients applying the amplitude of the movement of the hair. Each of these coefficients is set to a large value for the coordinates (x, y) of a position far from the center of the face. By setting a large value for the coordinates (x, y) of a position far from the center of the face, more natural movement of the hair can be represented (in animation). Those coefficients are values designated by referring to the delay-amount texture (see FIG. 6).

The terms of α1(x, y)×ωx(x, y, t), α2(x, y)×ωy(x, y, t), and α3(x, y)×ωz(x, y, t) in Eq. (5) and the terms of α5(x, y)×ωx(x, y, t), α6(x, y)×ωy(x, y, t), and α7(x, y)×ωz(x, y, t) in Eq. (6) are terms applying a relatively large movement of the hair in accordance with the movement of the head (or neck).

Of those terms, ωx, ωy, and ωz denote the angular velocities of rotation of the head around the x-axis, y-axis, and z-axis, respectively. The angular velocities are determined by the angular velocity calculating unit 47 and stored in the calculation value storage unit 48 in step S13. The calculation value storage unit 48 stores records of angular velocities. Which angular velocity is to be read from the records depends on the determined amount of delay.

That is, those terms are functions of the time t and are functions taking the effect of delay of propagation of the rotation of the head to a coordinate position (x, y) into consideration. Since the effect of delay is taken into consideration, softness or natural texture of soft materials such as hair can be enhanced in representation.

Accordingly, the terms involving α1, α2, α3, α5, α6, and α7 are functions of the time t and are functions taking the amount of delay into consideration. By rearranging ωx(x, y, t), ωy(x, y, t), and ωz(x, y, t) into equations taking the amount of delay into consideration, Eqs. (7), (8), and (9) are obtained as follows:

$$\omega x(x,y,t) = \omega x(t - g(x,y)) \quad \text{Eq. (7)}$$

$$\omega y(x,y,t) = \omega y(t - g(x,y)) \quad \text{Eq. (8)}$$

$$\omega z(x,y,t) = \omega z(t - g(x,y)) \quad \text{Eq. (9)}$$

In Eqs. (7), (8), and (9), g(x, y) is a term relating to the amount of delay, and the delay increases as the value of the function g increases. For example, as can be seen from Eq. (7), the calculation of ωx(t−g(x, y)) is performed using the angular velocity determined at a time the amount of delay g(x, y) prior to the time t. Therefore, as described above, the angular velocity to be read from the calculation value storage unit 48 is read from the records on the basis of the amount of delay determined by the delay amount determining unit 49 in step S14.

The amount of delay is designated by referring to the delay-amount texture shown in FIG. 6. That is, the delay amount determining unit 49 refers to the delay-amount texture to determine the amount of delay designated for the model-surface coordinates (x, y) to be processed. The delay amount determining unit 49 further reads the angular velocity based on the determined amount of delay from the calculation value storage unit 48, and supplies the read angular velocity to the texture changing unit 50.

The texture changing unit 50 performs a calculation based on Eqs. (5) and (6) given above, and calculates texture mapping coordinates for moving the hair.

In Eqs. (5) and (6), the α4(t) and α8(t) terms take the movement of hair fluttering all the time due to environmental conditions such as wind into consideration, and are calculated to represent the fluttering movement. The α4(t) and α8(t) terms are functions of vibration having a relatively high frequency, and are given by, for example, a sine curve or a superposition of sine curves.

The calculation of α4(t) and α8(t), which take the movement of hair fluttering all the time into consideration, can enhance the natural representation of the movement of the hair.

A hair area (i.e., a movable range) is thus designated, and a calculation taking the amount of delay into consideration is performed to change the details of a texture to be mapped within the movable range on a pixel-by-pixel basis. Therefore, a natural real-looking representation (in animation) can be achieved. Further, the pixel-based representation can be more easily realized. Furthermore, the above-described processes can be performed by the image processing apparatus 10 without the intervention of a user.

Image Processing Using Pixel Shader

In the foregoing embodiment, the CPU 11 (see FIG. 1) executes a predetermined program to perform the processes described above. The above-described processes can be performed using a pixel shader. With the user of the pixel shader, not only standard texture mapping but also any change of the address of a texture to be mapped on each pixel can be achieved.

Figure 17:
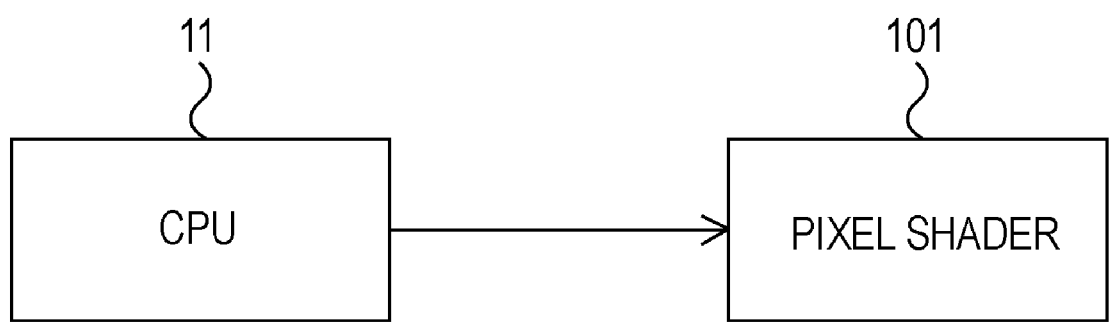
FIG. 17 is a diagram showing the structure of an image processing apparatus further including a pixel shader.

The structure further including a pixel shader 101 is shown in FIG. 17. As shown in FIG. 17, data necessary for the pixel shader 101 to perform the processes is supplied from the CPU 11 to the pixel shader 101. Specifically, the pixel shader 101 performs the calculations based on Eqs. (3) and (4). Thus, data necessary for the calculations of Eqs. (3) and (4) is supplied from the CPU 11 to the pixel shader 101.

The data supplied from the CPU 11 to the pixel shader 101 to perform the calculations based on Eqs. (3) and (4) includes data items 1 to 3 as follows:

data item 1 indicating the amplitude: α1, α2, α3, α5, α6, and α7 data item 2 indicating a delay: g(x, y)

data item 3 indicating the angular velocity of rotation of the head: ωx, ωy, and ωz The values α4 and α8 can be arbitrarily given by the program of the pixel shader 101, and may not be supplied from the CPU 11 to the pixel shader 101.

Figure 18:
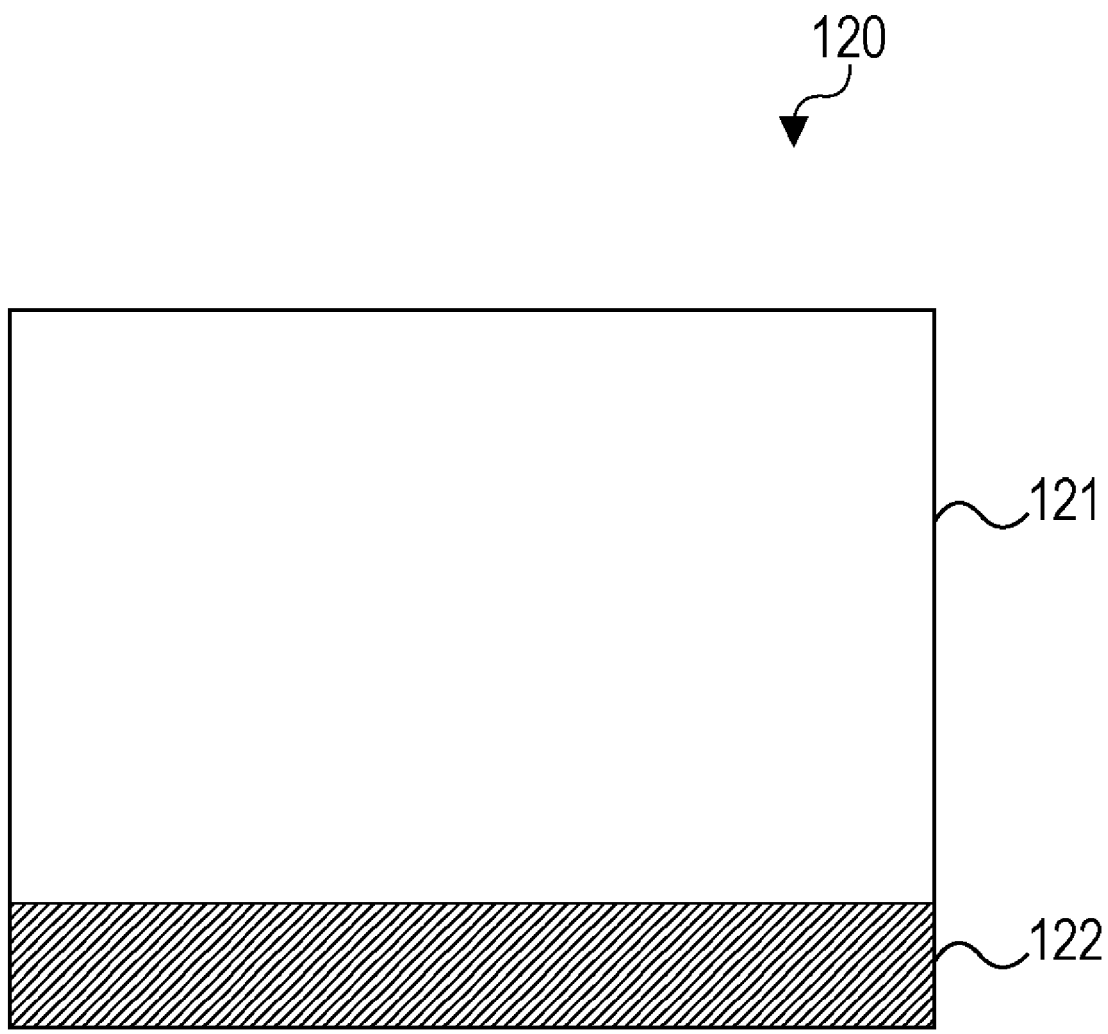
FIG. 18 is a diagram showing the data structure of a texture image containing data.

Since each of the data items 1 and 2 is a function of two variables x and y, the data items 1 and 2 can be included in a texture 120 shown in FIG. 18, and can be supplied to the pixel shader 101. That is, the texture image itself is a two-dimensional image having x and y coordinates and can include a function of the two variables x and y as an image. Therefore, the data items 1 and 2, each of which is a function of the two variables x and y, can be included in the texture 120, and can be supplied from the CPU 11 to the pixel shader 101 in the form included in the texture 120.

Specifically, as shown in FIG. 18, the texture 120 includes a texture portion 121 and a data portion 122 in predetermined upper and lower portions thereof, respectively. The texture portion 121 is assigned to a texture image, and the data portion 122 includes data.

The function of supplying a texture image from the CPU 11 to the pixel shader 101 is generally available and highly compatible with other functions. Therefore, the texture image including data other than textures can be supplied to and can be used by the pixel shader 101.

The data supplied to the pixel shader 101 includes three data items, namely, the data items 1 to 3. The data items 1 to 3 are supplied to the pixel shader 101 using multi-texture functions. An example is given below:

texture 1: texture images for hairs r, g, b, and a (standard texture images)

texture 2: images of the hairs r, g, b, and a having values α1, α2, α3, and α5 texture 3: images of the hairs r, g, b, and a having values α6, α7, and g(x, y)

Combination or elimination of α1, α2, α3, α5, α6, and α7 allows for a reduction in the number of textures to be used. This form may constitute an embodiment of the present invention.

Records of angular velocities included in the data item 3 are supplied from the CPU 11 to the pixel shader 101 by embedding record information of the angular velocities in a portion of any image in the multi-texture functions. This is because it may be difficult to provide the pixel shader 101 with variables of the sequence of angular velocities, or the pixel shader 101 may include the sequence of angular velocities and it may be difficult to determine an index of the sequence to be referred to during runtime.

The storage of angular velocities as a sequence means the storage of information at discrete times (discontinuous times). By embedding the angular velocities in a texture, advantageously, the filtering function of the texture can be used to extract the angular velocities as information (or a function) at continuous times that are automatically interpolated.

Accordingly, the pixel shader 101 can perform the above-described processes, that is, the processes described with reference to FIGS. 3 to 16, by including data in a texture and supplying the data from the CPU 11 to the pixel shader 101. The processes performed by the pixel shader 101 are similar to those described above, and a description thereof is thus omitted.

In a case where the pixel shader 101 performs the above-described processes, the advantages of achieving a natural real-looking representation, more easily realizing pixel-based representation, and performing the processes by the image processing apparatus 10 without the intervention of a user can also be achieved.

While an embodiment has been described in the context of an animation of hair, the present invention is not limited to this embodiment. The above-described processes can also be applied to animations of materials other than hair, such as an animation of trees swaying in the breeze.

In this specification, steps defining a program recorded on a program storage medium may include processes that are executed sequentially in the order described herein, and also include processes that are executed in parallel or individually, not necessarily sequentially.

In this specification, a system refers to an entire apparatus composed of a plurality of apparatuses.

Embodiments of the present invention are not limited to those described above, and a variety of modifications can be made without departing from the scope of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
   area designating means for designating an area to be processed from an input image, the area designating means being configured to:
      determine a hair area of the input image; and
      designate a movable range including a portion of the hair area along with a portion of a background area of the input image;
   delay amount setting means for setting an amount of delay in the movable range according to a distance from a reference position in the image;
   angular velocity calculating means for calculating angular velocities at a predetermined position in a predetermined number of images including the image;
   angular velocity storage means for storing records of the angular velocities calculated by the angular velocity calculating means;
   reading means for reading an angular velocity calculated at a time that is prior to a current time by the amount of delay set by the delay amount setting means from the angular velocity storage means when the image is changed within the movable range; and
   changing means for changing the image within the movable range using the angular velocity read by the reading means.

2. The image processing apparatus according to claim 1, further comprising angle calculating means for calculating an angle at the predetermined position from a difference between an image at a predetermined time and an image at a time prior to the predetermined time,
   wherein the angular velocity calculating means calculates each of the angular velocities from a difference between angles determined by the angle calculating means.

3. The image processing apparatus according to claim 1, wherein a changing process performed by the changing means is performed using a pixel shader, and
   data used for the pixel shader to perform the changing process is included in a texture and is supplied.

4. An image processing method, the method being executed by a computer and comprising the steps of:
   determining a hair area of an input image;
   designating a movable range including a portion of the hair area along with a portion of a background area of the input image;
   setting, by the computer, an amount of delay in the movable range according to a distance from a reference position in the image;
   calculating angular velocities at a predetermined position in a predetermined number of images including the image;
   controlling, by the computer, storage of records of the calculated angular velocities;
   reading, by the computer, an angular velocity calculated at a time that is prior to a current time by the set amount of delay from among the records whose storage is controlled when the image is changed within the movable range; and
   changing the image within the movable range using the read angular velocity.

5. A non-transitory, computer-readable storage medium storing a program which, when executed by a processor, causes a computer to perform a process comprising the steps of:
   determining a hair area of an input image;
   designating a movable range including a portion of the hair area along with a portion of a background area of the input image;
   setting an amount of delay in the movable range according to a distance from a reference position in the image;
   calculating angular velocities at a predetermined position in a predetermined number of images including the image;
   controlling storage of records of the calculated angular velocities;
   reading an angular velocity calculated at a time that is the set amount of delay prior to a current time from among the records whose storage is controlled when the image is changed within the movable range; and
   changing the image within the movable range using the read angular velocity.

6. An image processing apparatus comprising:
   an area designating unit configured to:
      determine a hair area of an input image; and
      designate a movable range including a portion of the hair area along with a portion of a background area of the input image;
   a delay amount setting unit configured to set an amount of delay in the movable range according to a distance from a reference position in the image;
   an angular velocity calculating unit configured to calculate angular velocities at a predetermined position in a predetermined number of images including the image;
   an angular velocity storage unit configured to store records of the angular velocities calculated by the angular velocity calculating unit;
   a reading unit configured to read an angular velocity calculated at a time that is prior to a current time by the amount of delay set by the delay amount setting unit from the angular velocity storage unit when the image is changed within the movable range; and
   a changing unit configured to change the image within the movable range using the angular velocity read by the reading unit.

* * * * *